(12) United States Patent
Lee Kon Ting

(10) Patent No.: US 11,969,063 B2
(45) Date of Patent: Apr. 30, 2024

(54) PROCESS OF MANUFACTURING OF ADORNMENT ARTIFACTS USING RECYCLED STRINGS OF TENNIS RACKETS

(71) Applicant: Peter Lee Kon Ting, Sao Paulo (BR)

(72) Inventor: Peter Lee Kon Ting, Sao Paulo (BR)

( * ) Notice: Subject to any disclaimer, the term of this patent is extended or adjusted under 35 U.S.C. 154(b) by 655 days.

(21) Appl. No.: 17/255,219

(22) PCT Filed: Aug. 12, 2019

(86) PCT No.: PCT/BR2019/050329
§ 371 (c)(1),
(2) Date: Dec. 22, 2020

(87) PCT Pub. No.: WO2020/034020
PCT Pub. Date: Feb. 20, 2020

(65) Prior Publication Data
US 2021/0259373 A1 Aug. 26, 2021

(30) Foreign Application Priority Data
Aug. 15, 2018 (BR) .......................... 1020180166379

(51) Int. Cl.
| A44C 27/00 | (2006.01) |
| B29B 13/02 | (2006.01) |
| B29C 39/02 | (2006.01) |
| B29K 101/12 | (2006.01) |
| B29L 31/00 | (2006.01) |

(52) U.S. Cl.
CPC .......... *A44C 27/001* (2013.01); *B29B 13/022* (2013.01); *B29C 39/026* (2013.01); *B29K 2101/12* (2013.01); *B29L 2031/743* (2013.01)

(58) Field of Classification Search
CPC ..... A44C 27/001; A44C 15/00; B29B 13/022; B29B 17/0047; B29C 39/026; B29C 43/18; B29K 2101/12; B29K 2105/26; B29L 2031/743; Y02W 30/62; A63B 51/02; C08J 11/04; C08J 11/06; C08J 2300/03
See application file for complete search history.

(56) References Cited

U.S. PATENT DOCUMENTS

| 3,190,086 A | 6/1965 | Klein | |
| 5,217,655 A * | 6/1993 | Schmidt | B29B 13/022 |
| | | | 264/172.19 |
| 5,800,892 A * | 9/1998 | Yee | B44C 5/00 |
| | | | 428/38 |
| 8,763,357 B1 * | 7/2014 | Arnone | A44C 25/007 |
| | | | 59/83 |
| 9,102,086 B2 * | 8/2015 | Roberts | B32B 5/20 |
| 9,512,342 B1 * | 12/2016 | Gutman | C08K 3/40 |
| 2009/0090133 A1 * | 4/2009 | Lee | A44C 15/004 |
| | | | 63/38 |
| 2012/0244353 A1 | 9/2012 | Wright | |
| 2012/0264543 A1 * | 10/2012 | Ward | A63B 57/50 |
| | | | 473/406 |
| 2013/0203525 A1 * | 8/2013 | Ward | A63B 57/207 |
| | | | 473/387 |
| 2014/0076485 A1 * | 3/2014 | Kelley-Galin | B44F 9/00 |
| | | | 156/306.6 |
| 2018/0208731 A1 * | 7/2018 | Vankayala | B29C 44/3461 |

FOREIGN PATENT DOCUMENTS

| CN | 101204261 | 6/2008 |
| CN | 203182168 | 9/2013 |
| GB | 878290 | 9/1961 |
| KR | 19980033646 | 7/1998 |
| WO | WO2015101376 | 7/2015 |

OTHER PUBLICATIONS

A. Subic, A. Mouritz, 0. Troynikov, "Sustainable design and environmental impact of materials in sports products", Sports Technology, (Nov. 8, 2010), 2(3-4), 67-79. Abstract, p. 68, paragraph 2; p. 71, paragraph 1; Table 1;figure 3.

* cited by examiner

*Primary Examiner* — Nahida Sultana
(74) *Attorney, Agent, or Firm* — Defillo & Associates, Inc; Evelyn A. Defillo

(57) ABSTRACT

The present innovation is an innovative process for the manufacturing of jewelry or jewels with silver or gold adornments, such as bracelets, necklaces, earrings, pendants, among other artifacts, from the re-utilization of strings of tennis rackets disposed of by players, forming a polymer mass that is treated to generate the pieces, such as beads, which make up the final artifact.

6 Claims, No Drawings

PROCESS OF MANUFACTURING OF ADORNMENT ARTIFACTS USING RECYCLED STRINGS OF TENNIS RACKETS

CROSS REFERENCE TO RELATED APPLICATION

This application is a national stage entry of PCT/BR2019/050329 filed Aug. 12, 2019, under the International Convention claiming priority over Brazilian Patent Application No. 102018016637-9 filed Aug. 15, 2018.

FIELD OF THE INVENTION

The present invention consists of a process of manufacturing artifacts, more specifically a process of fabrication of adornment objects from recycled materials, specifically a process of making adornment artifacts from recycled strings of tennis rackets.

PRIOR ART

The manufacturing of adornment objects has become an art, demanding years of practice to develop the skills required to master the tools in order to produce something with acceptable aesthetics and a quality standard.

The differential of this type of product is always the "brand", its name, which lends the article the aura of something unique, differentiated, giving the buyer the feeling of something personalized and exclusive.

When associating the exclusive fabrication with a differentiated raw material source, a product is created, which meaning transcends its use or its appearance, reaching an additional value, related to what it represents for the society.

SUMMARY OF THE INVENTION

The use of recycled strings of tennis rackets of famous players, creating articles that may be related to specific causes, such as support for social or popular initiatives, or that have a purely commercial meaning, represents a significant advance in this field of activity, making it possible to relate the name of each athlete with values, causes or charitable actions that represent their vocations, beliefs and values as citizens, without, of course, discarding the commercial value inherent to the product.

In this scenario, the solution of innovation herein presented has been developed, a process of making adornment artifacts from the reuse of the strings that are disposed of by the athletes and that would no longer be used.

Although similar processes of reuse of synthetic materials are already known, especially polymers, there is nothing similarly observed to the innovation herein proposed, which reconciles the reuse of synthetic materials with the generation of jewelry and customized jewelries with silver or gold adornments and associated with a particular name or brand.

DETAILED DESCRIPTION OF THE INVENTION

This innovation is a process for the re-utilization of synthetic materials, especially strings of tennis rackets for the manufacturing of personal use artifacts, such as jewelries and customized jewelries.

In this case, such products are translated into necklaces or bracelets, which beads are made from the recycled tennis racket strings, which are disposed of by the players.

Such strings are made of synthetic fibers of different colors and compositions, conferring distinct aspects in accordance with the manufacturer. Once disposed of, they are collected and treated in order to obtain a standardized size, capable of use in the manufacturing of the beads.

In order to be customized, the strings obtained undergo a processing, which may include the addition of dyes, so that they can acquire the desired aspect, according to the customer or target audience to be served.

Once treated, the strings are heated to the desired malleability point for handling, forming a mass with the polymer of the strings that can be molded into a mold to make the beads.

In a preferred configuration, of manual process, the said mold is of the "cube" type, provided with a series of recesses of different sizes. The mass then formed is captured at the tip of a rod suitable for handling the mass, conforming it in the mold to the desired shape, as close as possible to a sphere, endorsed with an inner channel that passes through the center of the sphere, forming the beads.

In an automated process, the polymer mass is molded according to the manufacturing parameters of the machinery.

The beads formed are then joined together by a wire passing through the central channel, connecting them in order to form a sequence of beads as a chain.

At each end of the chain, silver or gold fastening elements are fastened, such as clasps, which allow the forming of a necklace that can be closed by means of the above-mentioned clasps.

As part of the customization of the piece, a distinctive element, preferably of noble metal, is allocated among the beads or cast pieces, allowing the distinction of the piece in order to associate it with a specific personality of the sporting world, such as the player who provided the strings used in the manufacturing, an entity associated with a particular cause or even any logo.

This innovation is not limited to the representations herein commented or illustrated, and should be understood in its broad scope. Many modifications and other representations of the invention will come to the mind of those persons well acquainted with the technique to which this innovation belongs, having the benefit of the teaching presented in the previous descriptions and attached drawings. Furthermore, it is to be understood that the invention is not limited to the specific form revealed, and that modifications and other forms are understood as included within the scope of the attached claims. Although specific terms are used herein, they are used only in a generic and descriptive manner and not for the purposes of limitation.

The invention claimed is:

1. A process for manafacturing a jewelry article made of recycled tennis racket strings, the process comprising the steps of:
   collecting used tennis racket springs, the used tennis racket strings are made of synthetic materials,
   heating the used tennis racket strings to a malleability temperature of the synthetic materials to obtain a malleable mass,
   placing the malleable mass into a mold to form beads having an inner channel;
   joining together the beads by passing a string through the inner channel of each bead to form a chain having a first end and a second end;
   adding to each one of the first end and the second end of the chain a closing system, adding to the chain a customized element between two adjacent beads, and wherein the jewelry article is a bracelet, a necklace, earrings, or pendants.

2. The process according to claim 1, wherein the closing system is made of silver or gold.

3. The process according to claim 1, further including the step of adding a dye to the used tennis racket strings before the heating step.

4. The process according to claim 1, wherein the used tennis racket strings are of different colors and sizes.

5. The process according to claim 1, wherein the customized element is made of a noble metal material.

6. The process according to claim 1, wherein the customized element includes a logo.

* * * * *